Patented Dec. 21, 1948

2,456,759

UNITED STATES PATENT OFFICE 2,456,759

ACETYLENE TETRAMETHACRYLATE AND POLYMERS THEREOF

Jesse O. White, Arlington, N. J., assignor to E. I. du Pont de Nemours & Company, Wilmington, Del., a corporation of Delaware No Drawing. Application October 16, 1943, Serial No. 506,552

4 Claims. (Cl. 260—83)

This invention relates to polymerizable compounds and polymers obtained therefrom and, more particularly, to the preparation of acetylene tetraesters of alpha-methylene monocarboxylic acids and to polymers comprising such esters.

An object of the present invention is to provide a process for the preparation of acetylene tetraesters of alpha-methylene monocarboxylic acids. A further object is to provide polymers comprising such esters either alone or copolymerized with other polymerizable ethylenic compounds. A still further object is the provision of activators for use in the polymerization of polymerizable ethylenic compounds. Further objects of the invention are the provision of a process whereby the sheet-casting of polymerizable compounds such as styrene may be accomplished and the provision of a process whereby the granular polymerization of polymerizable compounds such as styrene may be accomplished. Other objects will be apparent from the description of the invention given hereinafter.

The above objects are accomplished according to the present invention by reacting glyoxal or glyoxal sulfate with anhydrides of alpha-methylene monocarboxylic acids, or, alternatively, compounds capable of reacting to form such anhydrides, to form acetylene tetraesters of alpha-methylene monocarboxylic acids; by polymerizing the resulting esters, and by copolymerizing such esters with other polymerizable ethylenic compounds.

More particularly, the preferred compounds of the present invention are acetylene tetraesters of alpha-methylene monocarboxylic acids which compounds have the formula:

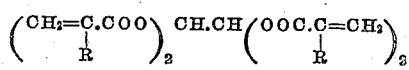

wherein R is a radical from the group consisting of hydrogen, alkyl, aryl, and halogen.

The herein considered esters polymerize readily to brittle, insoluble and infusible polymers. Their value lies especially in their ability to be copolymerized with other polymerizable ethylenic compounds to give polymers having very desirable properties and their ability to activate the polymerization of polymerizable ethylenic compounds which do not polymerize readily by themselves. Further, these esters may be partially polymerized to form fusible and soluble polymers which can then be further polymerized to an infusible and insoluble state.

The following examples are given to illustrate the invention, all parts being by weight unless otherwise noted:

EXAMPLE I

*Preparation of acetylene tetramethacrylate*

A reaction flask equipped with a mechanical stirrer and a reflux condenser is charged with the following:

| | Parts |
|---|---|
| Methacrylic anhydride | 800 |
| Diphenyl amine (polymerization inhibitor) | 18 |

To the agitated contents of the reaction flask are added portionwise over a period of 1½ hours, 109 parts of glyoxal sulfate. The temperature of the reaction mixture is maintained at 100° C.–110° C. throughout the addition, and for one hour longer. At the end of this time the reaction mixture is rapidly cooled to 10° C. while being vigorously agitated. 800 parts of cold water (0° C.–5° C.) are then carefully added so as to insure that the temperature of the reaction mixture does not rise above 25° C. and the solid material which separates, is then isolated by filtration. The isolated residue is vigorously stirred with 100 parts of cold water for several minutes and is again isolated by filtration. The residue is then suspended in 1,000 parts of water and this suspension is made alkaline by the drop-wise addition of a 20% sodium hydroxide solution. The solid material is again isolated by filtration, washed well on the filter with water, and then dried at 75° C. A portion of the solid material is recrystallized from methanol as white crystalline needles which melt at 130° C.

This solid material which is acetylene tetramethacrylate or, synonymously, tetramethacryloxyethane, rapidly polymerizes to a clear, brittle, insoluble and infusible polymer upon maintaining it for a short period of time slightly above its melting point. The ester may be maintained indefinitely at a temperature below its melting point without polymerization and without the use of inhibitors.

EXAMPLE II

*Alternative method of preparing acetylene tetramethacrylate*

In place of the 800 parts of methacrylic anhydride of Example I, there are substituted the following:

| | Parts |
|---|---|
| Acetic anhydride | 178 |
| Benzene sulfonic acid | 5 |
| Methacrylic acid | 900 |

With this substitution the procedure of Example I is followed with the result that acetylene tetramethacrylate is prepared but in yields somewhat inferior to those obtained by following the procedure of Example I.

This example illustrates the use of a mixture of compounds capable of reacting to form methacrylic anhydride rather than using methacrylic anhydride itself as a starting material in the manner illustrated in Example I.

EXAMPLE III

*Alternative method of preparing acetylene tetramethacrylate*

The procedure of Example I is again followed except that 30 parts of glyoxal and 5 parts of benzene sulfonic acid are substituted for the 109 parts of glyoxal sulfate. The gaseous glyoxal is added by bubbling it through the reaction mixture. Acetylene tetramethacrylate is thus obtained but in yields substantially lower than the yields obtained by following the procedure of Example I.

EXAMPLE IV

*Copolymerization of acetylene tetramethacrylate and styrene*

A mixture of 95 parts of styrene and 5 parts of acetylene tetramethacrylate is placed in a vapor tight container equipped with means for heating and agitating its contents. The atmosphere above the contents of the vessel is then purged with nitrogen and, while a slow stream of nitrogen is passed into the vessel and the contents are slowly agitated, the vessel is heated to a temperature of 80° C. As soon as the viscosity of the mixture has risen sufficiently so that the mixture resembles a thin syrup, i. e., in about 90 minutes, the mixture is cooled to about 20° C. To this polymeric syrup is then added 0.1 part of benzoyl peroxide dissolved in 5 parts of monomeric styrene. This mixture is then poured into a casting cell which consists of two sheets of plate glass separated by a flexible gasket, and the cell is placed in an autoclave and polymerized under a pressure of 150 pounds at a temperature of 75° C. for 16 hours. At the end of this time, the flexible gasket is removed from the cell and the cell is placed in an air oven at 90° C.–95° C. for 5 to 6 hours. The glass is then removed from the cast polymer sheet by placing the assembly in a large hot water bath (95° C.–100° C.) and allowing the water to cool slowly to room temperature. The polymer sheet is then seasoned in an air oven for 3 hours at 125° C.

The polymeric sheet thus produced possesses good color and clarity and is partially soluble in benzene. This sheet exhibits substantially no tendency toward crazing upon outdoor exposure and it may be formed into curved shapes by procedures similar to those generally employed in the art for the fabrication of curved shapes from thermoplastic sheets.

For purposes of comparison, polymerization of the styrene under the same conditions but with the 5 parts of acetylene tetramethacrylate omitted, was tried. A period of three days was required for the formation of a syrup possessing the viscosity of the syrup discussed above, and the casting of a satisfactory sheet could not be accomplished in any manner that would be commercially feasible.

EXAMPLE V

*Copolymerization of methyl methacrylate and acetylene tetramethacrylate*

A mixture of 95 parts of methyl methacrylate, 5 parts of acetylene tetramethacrylate, and 0.03 part of benzoyl peroxide, is polymerized by heating for 2 hours at about 70° C. The resulting interpolymer obtained by following this procedure was clear, tough, and insoluble in toluene and acetone.

EXAMPLE VI

*Copolymerization of butadiene, acrylonitrile, and acetylene tetramethacrylate*

A mixture of the following:

| | Parts |
|---|---|
| Butadiene, 1,3 | 67 |
| Acrylonitrile | 30 |
| Acetylene tetramethacrylate | 3 | is subjected to heating for 70 hours at 60° C. while suspended as an emulsion in double the quantity of water containing 0.5% ammonium persulfate and 0.5% sodium bisulfite. The copolymer isolated from this emulsion was a rubbery, light colored resinous material.

EXAMPLE VII

*Granular copolymerization of styrene and acetylene tetramethacrylate*

A mixture of:

| | Parts |
|---|---|
| Styrene | 95 |
| Acetylene tetramethacrylate | 5 |
| Benzoyl peroxide | 0.5 | is suspended with agitation in 230 parts of water containing 0.3 part of partially neutralized methacrylic acid. This suspension is then heated for 160 minutes at 94° C.–97° C. The granular polymer thus formed is isolated by filtering the suspension, it is then washed with water and dried at 75° C. for 5 hours. The resulting polymer is a white granular powder.

EXAMPLE VIII

*Copolymerization of styrene, methyl methacrylate, and acetylene tetramethacrylate*

A mixture of:

| | Parts |
|---|---|
| Styrene | 442 |
| Methyl methacrylate | 245 |
| Acetylene tetramethacrylate | 35 |
| Benzoyl peroxide | 0.7 | is heated at 80° C. for 70 minutes to give a polymeric syrup. This syrup is then poured between two glass plates separated by a flexible gasket and polymerized for 16 hours at 25° C. at 150 pounds pressure per square inch, followed by a treatment for 5 hours at 95° C. at atmospheric pressure. The sheet of polymer thus formed was then placed in a hot water bath (95° C.) and the bath allowed to cool slowly. The glass was then removed and the resulting sheet was seasoned at 125° C. for 2 hours. After this treatment the sheet was completely colorless, hard, and possessed no tendency to craze.

It will be understood that the above examples are merely illustrative and that the invention broadly comprises the monomers, polymers, and copolymers of the acetylene tetraesters of alpha-methylene monocarboxylic acids.

The alpha-methylene monocarboxylic acids are generally applicable in this invention and include acrylic, alpha-methacrylic, alpha-butylacrylic, alpha-heptylacrylic, alpha-cyclohexylacrylic, alpha-phenylacrylic, and alpha-chloroacrylic acids, of which the acrylic and alpha methacrylic acids are preferred.

As shown in Example I the esters of this invention are preferably prepared by reacting the anhydride of the necessary acid with glyoxal sulfate and thereafter isolating the acetylene tetraester produced thereby. These acetylene tetraesters may also be produced in somewhat less desirable yields by the reaction of the corresponding anhydride with glyoxal or glyoxal polymers in the presence of an acid condensation catalyst, e. g., sulfuric acid, aluminum chloride, ferric chloride, and the like, as illustrated in Example III. Furthermore, these esters may be prepared by reacting glyoxal or glyoxal sulfate with mixtures of compounds capable of reacting to form the indicated anhydride, as illustrated in Example II. Thus, these esters may be prepared by reacting a glyoxal or glyoxal sulfate with a mixture of acetic anhydride and methacrylic acid.

It is preferable to employ polymerization inhibitors, e. g., organic amines, copper salts, and the like, in the reaction mixture during the preparation of these esters in order to prevent polymerization of the products and/or the reactants.

The acetylene tetraesters of this invention may be polymerized alone or in the presence of a polymerization catalyst such as benzoyl peroxide or other peroxy compound, to form infusible and insoluble polymeric materials. These esters may also be partially polymerized to form fusible and soluble polymeric substances which upon being subjected further to polymerizing conditions will reach an infusible and insoluble state.

The acetylene tetraesters may be copolymerized with other polymerizable ethylenic compounds to give polymers having desirable properties, chiefly characterized by increased softening point and hardness and decreased solubility, as compared to the polymer composed entirely of the other polymerizable compound. These esters form copolymers not only with homopolymerizable ethylenic compounds, i. e., compounds that may be polymerized by themselves, but also with non-homopolymerizable-copolymerizable compounds, i. e., compounds that cannot be polymerized by themselves to any appreciable extent under feasible conditions. More specifically, the preferred polymerizable ethylenic compounds are the vinyl or substituted vinyl compounds of the formula $$CH_2=CH- \text{ or } CH_2=C<$$

Among the homopolymerizable vinyl and substituted vinyl compounds particularly desirable for copolymerization with these acetylene tetraesters are the esters of acrylic and methacrylic acids such as methyl methacrylate, ethyl methacrylate, iso-butyl methacrylate, alpha-phenyl methacrylate, glycol dimethacrylate, polyethylene glycol dimethacrylate, and heptyl acrylate; styrene, vinyl ketones, vinyl esters such as vinyl acetate, chloroprene, butadiene-1,3, itaconic esters, vinyl imides such as vinyl phthalimide and the like.

Polymerizable ethylenic compounds of the non-homopolymerizable type which may be copolymerized with these acetylene tetraesters, include alpha beta unsaturated dicarboxylic acids, esters or anhydrides thereof, such as diethyl maleate, maleic anhydride, and dimethyl fumarate, mesaconic acid, mesaconic acid esters, vinyl ethers, allyl and methallyl esters, and the like.

The present invention is not limited to any specific range of proportions of the components of the copolymers discussed above but, in general, more useful polymers result when 1%–10%, and, preferably, 2%–5%, by weight of the copolymer, of the acetylene tetraesters are employed.

It is a discovery of this invention that acetylene tetraesters of alpha-methylene monocarboxylic acids, and, in particular, acetylene tetramethacrylate, when copolymerized with polymerizable ethylenic compounds, particularly, with vinyl and substituted vinyl compounds such as those mentioned above, accelerate the polymerization of these compounds. Thus styrene, which possesses a rather slow polymerization rate and may take as long as three days to polymerize to a solid mass at 75° C. in the presence of 0.1% benzoyl peroxide, may be polymerized to a solid mass in 70 minutes by forming a mixture of 95% styrene and 5% of acetylene tetramethacrylate.

The accelerating or activating effect of these acetylene tetraesters is further shown by the fact that compounds which have heretofore been impossible to polymerize or could only be polymerized to a very small extent, may be readily polymerized by incorporating therein a small amount of one of these acetylene tetraesters. Further, the polymerization of these acetylene tetraesters in small quantities with compounds possessing a slow polymerization rate, e. g., styrene, makes possible the commercial sheet-casting of sheets of these compounds and the granular polymerization of such compounds, both of which processes have not been commercially feasible heretofore. Various quantities of the acetylene tetraesters may be employed as polymerization accelerators but it is preferable to use between 0.05% and 5.0% of these esters, by weight of total polymerizable material, for this purpose. Polymerization catalysts such as benzoyl peroxide and other peroxy compounds, persulfates, or other catalysts known to accelerate the polymerization of polymerizable ethylenic compounds, may be used in conjunction with these esters.

The acetylene tetraesters of the present invention and the polymers formed by copolymerizing these esters with other polymerizable compounds, either alone or in the presence of plasticizers, fillers, pigments, synthetic and natural waxes, are useful in the preparation of cast and molded articles. These esters are particularly advantageous when copolymerized with other polymerizable materials since they impart to the resulting polymers increased softening points, increased hardness, and decreased solubility.

Polymers of these acetylene tetraesters, either alone or in the presence of other resinous bodies, pigments, dyes, plasticizers, and the like, may be advantageously employed as lacquers and paints for the coating of glass, wood, metal, and similar materials. They are also useful for the coating and impregnation of cloth, paper, and similar fibrous materials.

A particular and advantageous use for these acetylene tetraesters is as polymerization accelerators for the polymerization of ethylenic compounds which are slow to polymerize under ordinary conditions. By using these esters in suitable amounts it is possible to effect the polymerization of compounds which could not otherwise be polymerized without the incorporation with them of these esters, or which could be polymerized only by long and extended reaction time.

Thus, the use of these tetraesters as polymerization accelerators makes feasible the commercial sheet casting of polymerizable compounds characterized by slow polymerization rates, and the granular polymerization of such compounds.

As many apparently widely different embodiments of this invention may be made without departing from the spirit and scope thereof, it is to be understood that the invention is not limited to the specific embodiments thereof except as defined in the appended claims.

I claim:
1. Acetylene tetramethacrylate.
2. Process of preparing an acetylene tetraester of an alpha-methylene monocarboxylic acid which comprises reacting in the neighborhood of 100° C. glyoxal sulfate wth an anhydride of an alpha-methylene monocarboxylic acid having the formula:

$$CH_2=C.COOH$$
$$|$$
$$R$$

wherein R is a radical from the group consisting of hydrogen, alkyl, aryl, and halogen.

3. Process of preparing acetylene tetramethacrylate which comprises reacting in the neighborhood of 100° C. glyoxal sulfate with methacrylic anhydride.
4. A polymeric product obtained by polymerizing a composition comprising acetylene tetramethacrylate.

JESSE O. WHITE.

REFERENCES CITED

The following references are of record in the file of this patent:

UNITED STATES PATENTS

| Number | Name | Date |
|---|---|---|
| 2,273,891 | Pollak | Feb. 24, 1942 |
| 2,312,193 | Richter | Feb. 23, 1943 |

FOREIGN PATENTS

| Number | Country | Date |
|---|---|---|
| 542,642 | Great Britain | Jan. 21, 1942 |

OTHER REFERENCES

Chemical Abstracts, vol. 11, page 2801 (1917).